United States Patent
Wright et al.

(10) Patent No.: US 7,625,470 B2
(45) Date of Patent: Dec. 1, 2009

(54) ELECTROLYTIC CHEMICAL GENERATOR FOR AUTOMATIC CLEANING DEVICE

(75) Inventors: Tremitchell L. Wright, Elkhart, IN (US); Dennis Kehl, Benton Harbor, MI (US); Robert J. Rolek, St. Joseph, MI (US); Joel A. Luckman, Stevensville, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 571 days.

(21) Appl. No.: 10/823,283

(22) Filed: Apr. 13, 2004

(65) Prior Publication Data

US 2005/0224339 A1     Oct. 13, 2005

(51) Int. Cl.
*C25B 1/26* (2006.01)
*B08B 3/08* (2006.01)
*B08B 3/10* (2006.01)

(52) U.S. Cl. .............. 204/233; 204/268; 204/278.5; 134/93; 134/109; 68/12.18

(58) Field of Classification Search .............. 204/275.1, 204/278.5
See application file for complete search history.

(56) References Cited

U.S. PATENT DOCUMENTS

| | | | | |
|---|---|---|---|---|
| 2,917,685 A * | 12/1959 | Wiegand | ..................... | 257/714 |
| 4,085,028 A * | 4/1978 | McCallum | ................... | 204/269 |
| 4,599,158 A * | 7/1986 | Ofenloch | .................. | 204/229.5 |
| 5,076,952 A * | 12/1991 | Ahmed et al. | ................ | 510/221 |
| 6,006,387 A * | 12/1999 | Cooper et al. | ................... | 8/158 |
| 6,125,481 A * | 10/2000 | Sicilano | ......................... | 4/509 |
| 6,391,167 B1 * | 5/2002 | Grannersberger | ......... | 204/228.3 |
| 6,408,471 B1 * | 6/2002 | Teran et al. | ..................... | 8/158 |
| 6,418,580 B1 * | 7/2002 | Teran et al. | ..................... | 8/158 |
| 6,507,965 B2 * | 1/2003 | Kown | .............................. | 8/158 |
| 6,513,180 B2 * | 2/2003 | Hamand | ......................... | 8/158 |
| 6,598,431 B2 * | 7/2003 | Teran et al. | ................. | 68/17 R |
| 6,716,325 B2 * | 4/2004 | Bentley | ....................... | 204/272 |
| 6,821,398 B2 * | 11/2004 | Von Broembsen | ........ | 204/278.5 |
| 2003/0213503 A1 * | 11/2003 | Price et al. | ..................... | 134/18 |
| 2005/0224099 A1 * | 10/2005 | Luckman et al. | ............... | 134/41 |
| 2005/0268404 A1 * | 12/2005 | Laithwaite | ....................... | 8/158 |

\* cited by examiner

*Primary Examiner*—Harry D Wilkins, III
(74) *Attorney, Agent, or Firm*—Clifton G. Green; Greer, Burns & Crain Ltd (57) ABSTRACT

A chemical generator device is arranged in association with an appliance having a cleaning zone where objects are cleaned. The chemical generator device includes an inlet to allow the introduction of at least one chemical composition, an operative area where a desired chemical composition is generated by utilizing the at least one chemical composition, an outlet communicating with the cleaning zone of the appliance, and a dispensing apparatus arranged to dispense the generated chemical composition to the cleaning zone from the operative area through the outlet.

32 Claims, 4 Drawing Sheets

ELECTROLYTIC CHEMICAL GENERATOR FOR AUTOMATIC CLEANING DEVICE

BACKGROUND OF THE INVENTION

Cleaning a soiled load of objects in automatic cleaning appliances and other appliances generally involves the use of chemical energy (such as detergent), mechanical energy (such as through agitation of the object load in a wash liquor or the manner of dispensing the wash liquor against the object load, such as by spraying) and/or thermal energy (such as through an elevated temperature of the wash liquor). Different combinations of these energy inputs provide various levels of soil removal from the load. Depending on the type of objects in the load, there may be attendant damage, such as when the load comprises fabric, resulting in the generation of lint or the fading of various colors of the fabric, etc. Other types of objects could be subject to chemical etching or other types of damage.

Numerous types of chemical wash additives are known, such as detergents which include surfactants and emulsifiers, as well as enzymes, all used to dissolve, loosen and/or remove various soils and stains. Additional chemical additives in the form of bleaches, such as chlorine-based bleaches have been used to effect soil removal, particularly on white fabrics, since such bleaches are effective to remove colors from fabrics as well. With a fashion trend changing from white fabrics to vibrant colors, the use of chlorine-based bleaches has become problematic.

There has been a development of color-safe bleaches, such as oxygen-based bleaches, also referred to as oxidizing agents. One such oxygen bleach that has been receiving consideration is hydrogen peroxide.

Typically the detergents and chemical wash additives are required to be dispensed by the user into the cleaning appliance either with each load of objects to be cleaned, or at least on a periodic basis, such as through the use of a refillable chemical storage container associated with the cleaning appliance. The addition of these various chemistries requires that the user maintain a supply of the chemistries on hand in order to be able to perform the desired cleaning functions as needed. Also, the manual addition of these chemistries requires careful dispensing in order to avoid spillage and waste of the chemistries and damage to the fabrics.

It would be an improvement in the art if an arrangement were provided for generating some or all of the desired chemistries directly at or in association with the cleaning appliance in order to avoid the drawbacks mentioned above.

SUMMARY OF THE INVENTION

An apparatus associated with an automatic cleaning appliance is provided which overcomes the problems noted above and provides the generation of desired chemistries directly at or in association with the cleaning appliance. In some embodiments, a continuous supply of the components necessary to generate the desired chemistries can be connected to the apparatus so that the user need not periodically add chemistries to the apparatus or appliance. In some embodiments, the generated chemistries are dispensed automatically to the appliance avoiding the need for the user of the appliance to manually dispense the chemistries into the appliance.

In an embodiment of the invention, a chemical generator device is arranged in association with an appliance having a cleaning zone where objects are cleaned. The chemical generator device includes an inlet to allow the introduction of at least one chemical composition, an operative area where a desired chemical composition is generated by utilizing at least one chemical composition, an outlet communicating with the cleaning zone of the appliance, and a dispensing apparatus arranged to dispense the generated chemical composition to the cleaning zone from the operative area through the outlet.

In an embodiment of the invention, the chemical generator device includes an electrolysis apparatus in the operative area.

In an embodiment of the invention, a continuous supply of at least one chemical composition is connected to the inlet.

In an embodiment of the invention, the dispensing apparatus is arranged to automatically dispense the generated chemical composition to the cleaning zone during a cleaning operation of the appliance.

In an embodiment of the invention, an electrochemical cell device is arranged in an appliance used in the cleaning of objects. The electrochemical cell device includes a first metallic plate, a last metallic plate and a plurality of intermediate metallic plates, with each of the plates having two essentially parallel sides with a large surface area in comparison with a peripheral side connecting the parallel sides. The plurality of plates are arranged with one of the parallel sides of one plate facing one of the parallel sides of an adjacent plate, for each of the plurality of intermediate plates. A connection is provided between a positive electrode of a source of direct electrical current and the first plate and a connection is provided between a negative electrode of the source of direct electrical current and the last plate. Also provided is an inlet to allow the introduction of a fluid containing a chemical composition to be decomposed by said cell device during a period of decomposition and an outlet to allow the dispensing of the resultants of the decomposition of the chemical composition.

In an embodiment of the invention, the plurality of plates are arranged in a straight line.

In an embodiment of the invention, the plurality of plates are arranged in an arc.

In an embodiment of the invention, the automatic cleaning appliance is a fabric washing machine.

In an embodiment of the invention, the source of direct electrical current comprises a source of rectified alternating current and wherein the electrical components providing the rectified current are arranged to be cooled with water used in the cleaning appliance.

In an embodiment of the invention, the fluid containing a chemical composition comprises water and the resultants comprise hydrogen and oxygen.

In an embodiment of the invention, the fluid containing a chemical composition comprises water and a dissolved salt and the resultants comprise at least chlorine.

In an embodiment of the invention, the electrochemical generating device further includes a storage space arranged to receive a supply of a salt composition in solid form to be dissolved by water obtained from a source of water in the appliance to be used in the cleaning of objects.

In an embodiment of the invention, the appliance further includes a lockout mechanism and an activating apparatus for the lockout mechanism, the activating apparatus including a sensor arranged to detect a concentration level of the chlorine.

In an embodiment of the invention, the positive electrode connection at the first plate and the negative electrode connection at the last plate comprise the sole direct electrical connections between the source of direct electrical current and the plates.

In an embodiment of the invention, the source of direct electrical current comprises a source of rectified alternating current.

In an embodiment of the invention, the source of direct electrical current comprises a source of inverted alternating current.

In an embodiment of the invention, the fluid comprises an electrolyte and the plates are arranged in an electrical series connection with the electrolyte providing an electrical connection between adjacent plates.

In an embodiment of the invention, the fluid containing a chemical composition comprises water obtained from a source of water in the appliance to be used in the cleaning of the objects, and including a filter upstream of the plates.

In an embodiment of the invention, a control is arranged to monitor a voltage across the first and last plates.

In an embodiment of the invention, a control is arranged to regulate an electrical current flowing through the electrodes.

In an embodiment of the invention, a control is arranged to monitor a pressure change between the inlet and the outlet.

In an embodiment of the invention, a back-washing mechanism is arranged to remove materials deposited onto the plates during the period of decomposition.

In an embodiment of the invention, the back-washing mechanism is arranged to back-wash via a chemical technique.

In an embodiment of the invention, the back-washing mechanism is arranged to back-wash via a thermal technique.

In an embodiment of the invention, the back-washing mechanism is arranged to back-wash via a mechanical technique.

In an embodiment of the invention, the objects are cleaned in a wash liquor in the cleaning appliance and the resultants have characteristics to permit an altering of a pH of the wash liquor.

DETAILED DESCRIPTION OF THE PREFERRED EMBODIMENT

The present invention is an apparatus associated with an automatic cleaning appliance, the appliance being arranged to generate a desired chemical composition to be used during the cleaning cycle of the appliance.

As used herein, cleaning or cleaning appliance is meant to include the removal of soil, impurities, stains or odors from the objects, or the relaxation of wrinkles in objects such as fabrics, for example, clothes and other textiles, whether such cleaning occurs in a fluid bath or through the application of a liquid, a vapor or a gas. The cleaning appliances, in addition to the application of chemical energy to the objects to effect the cleaning, may also utilize the application of mechanical or electromagnetic energies, such as heat, ultraviolet radiation and microwave radiation. The application of mechanical energies could include the use of agitators, vanes, impellers, rotation of the cleaning zone, ultrasonic waves, spray or jet dispensers and other mechanisms for applying mechanical energy to the objects being cleaned.

The objects, during the cleaning process, may be moved within the cleaning zone of the cleaning appliance such as by having a portion of the cleaning zone rotate around a vertical axis, a horizontal axis, a tilted axis, or the objects may remain stationary. The wash liquor, generally carrying the chemical energy, may be applied to the objects by spraying or otherwise impinging the objects with the wash liquor, immersing the objects in the wash liquor, or applying the chemical energy through the use of foams, mists or vapors.

The present invention is directed to a device for generating a desired chemical composition at or in association with the cleaning appliance. Although a variety of chemical compositions may be generated in such a device, one such chemical composition is hydrogen peroxide, and the generation of this particular chemical composition is discussed in detail below. However, it should be understood that the present invention is not limited to this particular chemical composition. Some additional chemical compositions include ozone, percarbonate, perborate, singlet oxygen, peroxy acids ($RCO_3H$), hypochlorite, chlorine and chlorine dioxide, metal oxyacids such as all forms of chromium (VI) and permanganate ion ($KMnO_4$), nitric acid, nitrous acid, sodium peroxide, halogens, but more specifically $Br_2$ and $Cl_2$ and compounds containing $Cl^-$ and $Br^-$ and mild oxidizing agents such as $Ag^+$ and $Cu^{2+}$.

The wash liquor, in some embodiments may be water based, and in other embodiments may be a non-aqueous fluid. Some of these additional fluids are non-aqueous liquid solvents such as fluorinated solvents, perchloroethylene, siloxane-based solvents, hydrocarbon-based solvents, ionic liquids, liquid $CO_2$ and combinations thereof. More specifically, the fluorinated solvents are selected from the group comprising methoxynonafluorobutane, ethoxynonafluorobutane and decafluoropentane. The siloxane-based solvents can be selected from decamethylcyclopentasiloxane, dodecamethylpentasiloxane, decamethyltetrasiloxane and combinations thereof. Finally, gases, partially compressed gases and compressed gases including air and $CO_2$ may be an acceptable medium as well.

Figure 1:
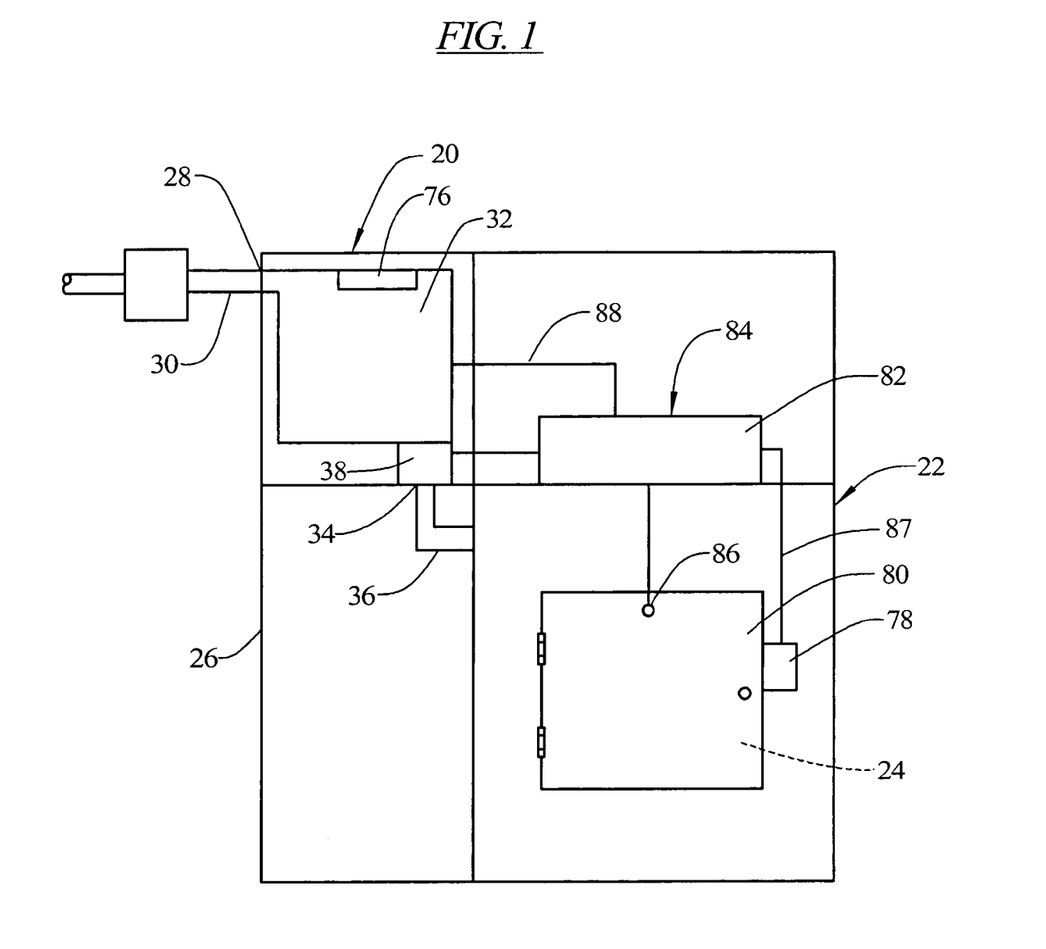
FIG. 1 schematically illustrates a cleaning appliance and an associated chemical generator device.

As illustrated in FIG. 1, a chemical generator device 20 associated with an automatic cleaning appliance 22 is provided which provides the generation of desired chemistries directly at or in association with the cleaning appliance. In some embodiments, a continuous supply of the elements necessary to generate the desired chemistries can be connected to the device 20 so that the user need not periodically add chemistries to the device 20 or the appliance 22. In some embodiments, as described below, the generated chemistries are dispensed automatically to the appliance 22 avoiding the need for the user of the appliance to manually dispense the chemistries into the appliance.

The chemical generator device 20 is arranged in association with the appliance 22 which has a cleaning zone 24 where objects are cleaned. The chemical generator device 20 may be located within an outer cabinet 26 of the appliance, or may located outside of the cabinet in a generally close proximity to the appliance 22. The chemical generator device 20 includes an inlet 28 to allow the introduction of at least one chemical composition. The chemical composition may be introduced through the inlet 28, such as by a user pouring or otherwise dispensing a discrete quantity of the chemical composition through the inlet 28, or a supply conduit 30 may be attached to the inlet 28 such that the chemical composition may be directed to the inlet through the conduit from a source of supply which may be a reservoir of a finite volume, or may be from a source of a relatively continuous supply. For example, if the chemical composition is water, the conduit 30 may be connected to a water conduit located in the building where the appliance is located, thereby providing a relatively continuous supply of water.

The chemical generator device also includes an operative area 32 where a desired chemical composition is generated by utilizing the at least one chemical composition. A particular arrangement for use in the operative area 32 is described below. An outlet 34 is provided at the chemical generator device 20 which is arranged to communicate with the cleaning zone 24 of the appliance 22. The outlet 34 may lead directly to the cleaning zone 24, or a separate conduit 36 may be provided between the outlet 34 and the cleaning zone 24. In the embodiments where the chemical generator device is located outside of the cabinet 26 of the appliance 22, such a conduit 36 is generally required.

In some embodiments, the chemical generator device 20 also includes a dispensing apparatus 38 arranged to dispense the generated chemical composition to the cleaning zone 24 from the operative area 32 through the outlet 34. In some embodiments, the generated chemical composition may be dispensed through the outlet via gravity, in other embodiments the generated chemical composition may be dispensed due to a pressure associated with the chemical composition being introduced through the inlet 28, or due to a pressure developed during the generation of the generated chemical composition. In other embodiments, the generated chemical composition may be dispensed through the use of a pump. In an embodiment of the invention, the dispensing apparatus 38 is arranged to automatically dispense the generated chemical composition to the cleaning zone 24 during a cleaning operation of the appliance 22.

Figure 2:
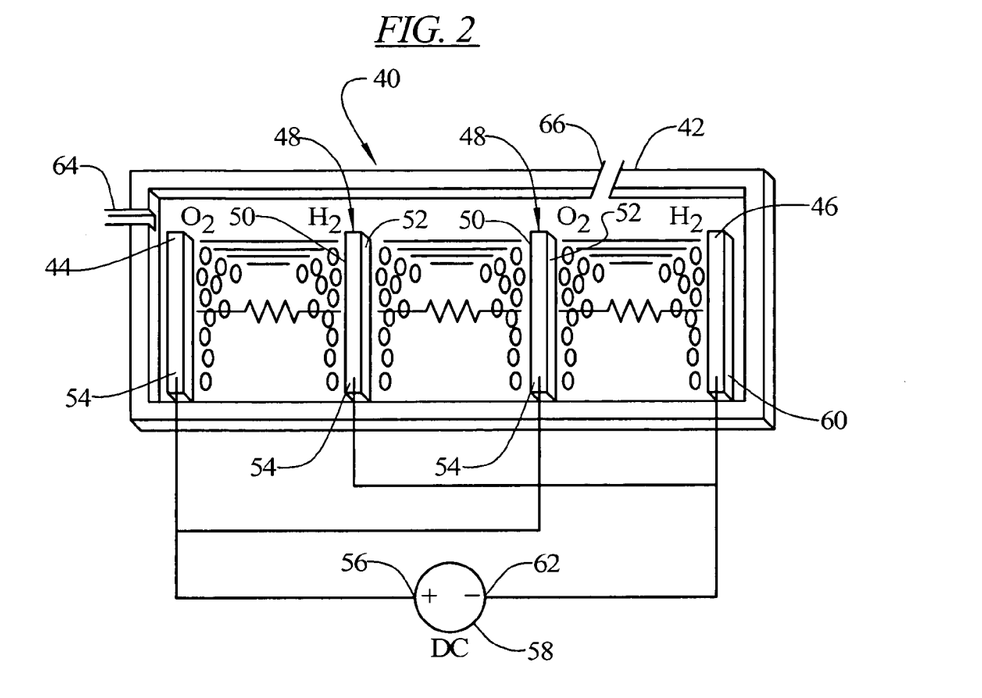
FIG. 2 illustrates a parallel electrolysis cell.

In an embodiment of the invention, the chemical generator device 20 includes an electrochemical cell device 40 in the operative area 32. The electrochemical cell may, depending on the chemical composition to be generated, be an electrolysis apparatus 42 as illustrated in FIG. 2. Such an apparatus 42 is useful in generating hydrogen and oxygen gases from an input of water. These gases can be used to generate hydrogen peroxide through a recombination with water, in the presence of a catalyst, such that the generated chemical composition, hydrogen peroxide, can be formed solely by utilizing water as the chemical composition introduced to the chemical generating device 20. A relatively continuous supply of water can be provided through the conduit 30 leading to the inlet 28 of the chemical generating device.

The electrolysis apparatus 42 includes a first metallic plate 44, a last metallic plate 46 and a plurality of intermediate metallic plates 48. Each of the plates have two essentially parallel sides 50, 52 with a large surface area in comparison with a peripheral side 54 connecting the parallel sides 50, 52. The plurality of plates 48 are arranged with one of the parallel sides 50, 52 of one plate facing one of the parallel sides 50, 52 of an adjacent plate, for each of the plurality of intermediate plates. In some embodiments, the plates may be arranged in a straight row such that facing sides 50, 52 would be arranged in a parallel manner, while in other embodiments, the plates 44, 46, 48 may be arranged in an arcuate manner, in which the facing sides 50, 52 would be arranged at an angle to each other, which typically would be less than 45 degrees.

Figure 3:
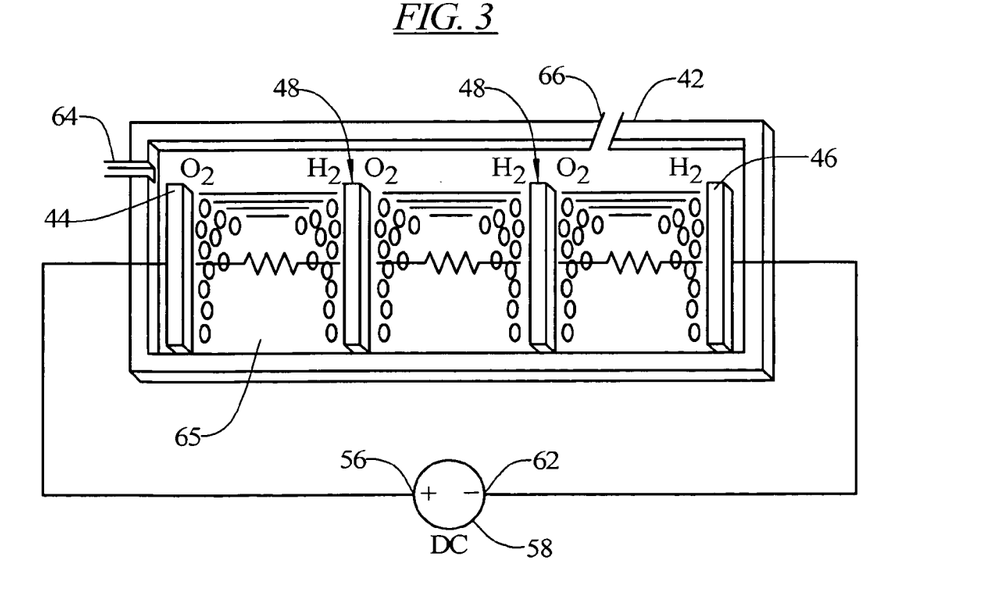
FIG. 3 illustrates a series electrolysis cell.

A connection 54 is provided between a positive electrode 56 of a source 58 of direct electrical current and the first plate 44 and a connection 60 is provided between a negative electrode 62 of the source 58 of direct electrical current and the last plate 46. In a parallel electrolysis system, as shown in FIG. 2, alternating plates are connected to the positive 56 and negative 62 electrodes. This allows each plate 44, 46, 48 to generate a single gas. In a series electrolysis system, as shown in FIG. 3, connections from the positive electrode 56 and the negative electrode 62 are made with only the first 44 and last 46 plates and both gases would be formed at each plate, although on opposite sides of each plate. In such an arrangement, a fluid 65 in the electrolysis apparatus 42 comprises an electrolyte and the plates 48 are arranged in an electrical series connection with the electrolyte providing an electrical connection between adjacent plates. Either type of electrolysis system could be utilized in accordance with the principles of the present invention.

The cells shown in FIGS. 2 and 3 each have an inlet 64 to allow the introduction of a fluid containing a chemical composition to be decomposed by the cell device during a period of decomposition and an outlet 66 to allow the dispensing of the resultants of the decomposition of the chemical composition.

As seen in FIGS. 2 and 3, the plurality of plates 48 are arranged in a straight line and the facing sides 50, 52 are parallel to each other.

Figure 4:
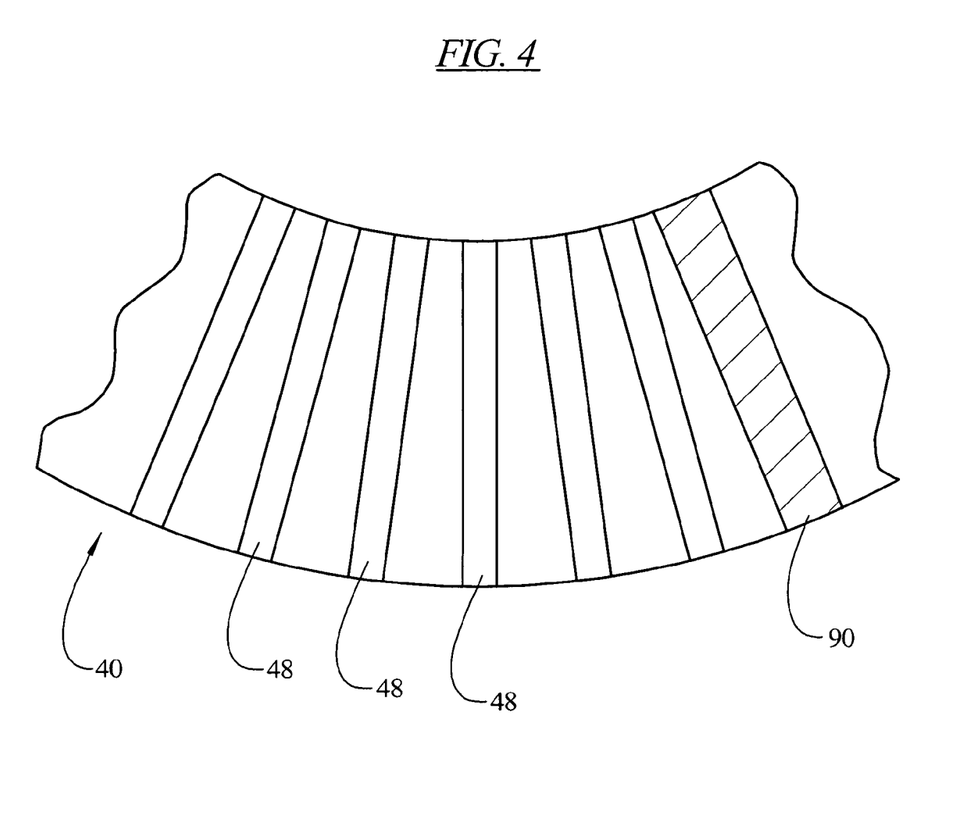
FIG. 4 illustrates an electrolysis cell arranged in an arc.

As seen in FIG. 4, the plurality of plates 48 are arranged in an arc. The arc may comprise a minor portion of a circle, that is, less than 180 degrees, or may comprise a major portion, up to nearly 360 degrees. Further, the series of plates 48 may be arranged in a serpentine fashion or may be arranged in straight portions and arcuate portions, depending on the space limitations for the electrochemical cell device.

In an embodiment of the invention, the automatic cleaning appliance is a fabric washing machine, such as a domestic automatic clothes washer. In another embodiment, the automatic cleaning appliance is a foodware washing machine, such as a domestic automatic dishwasher. Such embodiments have advantages and synergies, particularly where the washing machine uses an aqueous based wash liquor and therefore have a connection to a source of water that can be used as the initial chemical composition. In such situations, a filter 68 (FIG. 1) may be arranged in the water inlet line 30. The filter could be any type of fluid conditioning device, which may include a mechanical filter mechanism or a chemical treating mechanism, such as a water softening mechanism. There are different types of filtering mechanisms that by be effective. For example, a metal, paper or coarse filter may be implemented at the inlet of the system. This filter will minimize particulate fouling of the electrochemical cell as well as increase the effectiveness of the oxidizing agent. This filter may be provided with a self-cleaning mechanism. Additionally, the inlet water or water directed to the electrochemical cell may pass through a fluid conditioning device such as a water softening mechanism. The purpose of this mechanism will be to reduce the contamination concentration of the water to less than 1000 parts per million of a calcium carbonate equivalent, more preferably less than 500 parts per million and most preferably less than 100 parts per million. As a result, the performance of the system will be enhanced.

Figure 5:
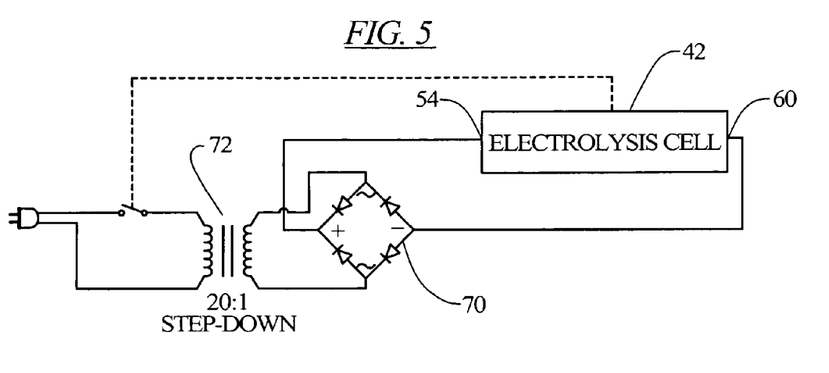
FIG. 5 illustrates a power supply for a parallel cell including a step down transformer.
Figure 6:
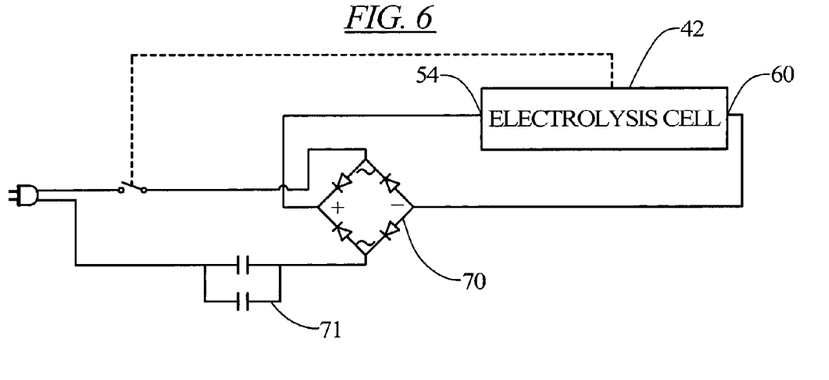
FIG. 6 illustrates an alternative power supply with a capacitor arrangement.
Figure 7:
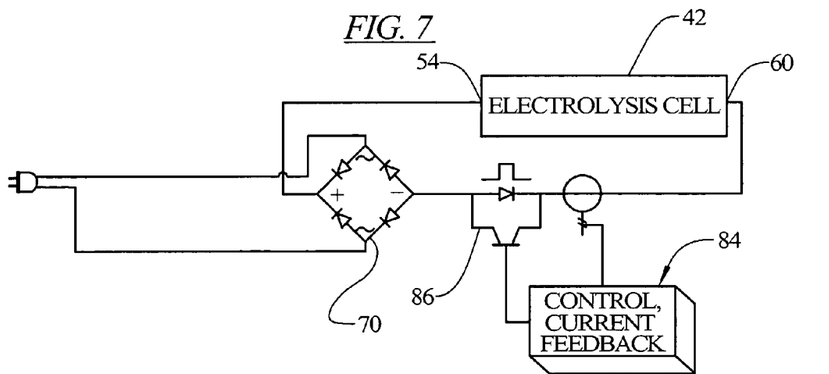
FIG. 7 illustrates an alternative power supply.

The water supply, when used for an aqueous based wash liquor, can also be utilized in other ways. For example, the source 58 of direct electrical current may comprise a source of rectified alternating current as illustrated in FIGS. 5-7, and electrical components 70, 71, 72 providing the rectified current may be arranged to be cooled with water used in the clothes or dish washing machine. The source of direct electrical current might also comprise a source of inverted alternating current and the electrical components providing the inverted current may be cooled. The water thus heated could subsequently be used in the washing process and any energy requirements for heating the water would thereby be reduced.

FIG. 5 schematically illustrates a power supply for a parallel cell electrochemical generating device which includes a step down transformer to convert 120 volt power to 2.5 volts, and 250 amps of current. A diode rectifier 70 converts the alternating current from the transformer to a direct current before the current is supplied to the connections 54, 60 of the electrolysis apparatus 42.

FIG. 6 schematically illustrates an alternative power supply for a parallel cell electrochemical generating device which includes a capacitor arrangement 71 which provides 5 amps of current at 90 volts to leading to the diode rectifier 70, which in turn converts the alternating current from the capacitor arrangement to a direct current before the current is supplied to the connections 54, 60 of the electrolysis apparatus 42.

FIG. 7 schematically illustrates an alternative power supply for a parallel cell electrochemical generating device. The electrical terminal characteristics of the electrochemical cell, to which the power supply is connected, are tailored to maximize voltage and minimize current. The primary goal of this power supply is to deliver charge via direct current at a reasonable approximation. A potential appropriate to assure that the rate of charge delivered is adequate to cause the desired electrochemical activity. The emphasis in the design strategy of this power supply is to power an electrochemical cell system at the highest practical voltage. This strategy assures the components of the power supply can be operated at high optimum overall system efficiency. The floating cell electrolyzer is an optimum load for the proposed power supply as a result of its relatively high net resistance.

The basis for the power supply is a conventional rectifier/inverter 70 with DC link power converter topology. Rectification efficiency can be maximized since the current is one-twentieth the voltage. Single phase or multi-phase source power can be delivered to the rectifier 70. The DC link can be unfiltered since a control 84 can monitor line voltage and regulate accordingly. The link could also be operated directly from a direct current source such as a battery. A boost circuit may be incorporated in the power converter to boost efficiency by allowing the inverter to operate at a highest possible voltage. The inverter output will be switched at switch element 86 in a suitable pulse with modulation pattern and sufficiently high carrier frequency. The inverter power delivery will approximate direct current as a result of the switching pattern.

The inverter switching topology can either be a low side switch or H-bridge configuration. The switches may be FET or IGBT based or other suitable low loss, high voltage semiconductor. Semiconductor selection based on high cell resistance would minimize thermal system overhead. Active switching would also assure that the line and load impedance match and maximum power transfer is achieved.

The thermal system required for heat removal from the semiconductors could be a conventional air system or could be liquid cooled. A liquid cooled heat removal system could exploit the water often used in conjunction with the electrolysis cell and its cooling. Heat trapped could potentially be recovered and used in subsequent processes related to the products from the electrochemical action.

Routine power supply monitoring systems, like current and voltage sensing, would provide a direct feedback signal precisely describing the electrochemical cell conditions. Cell property measurements, taken by the power supply control, in a static electrochemical cell, would be an indication of water level. Power supply feedback in a flowing electrochemical cell would be a means of regulating the electrolyte concentration, dynamically. Cell temperature changes resulting from losses in the electrochemical conversion process can also be monitored and regulated. Down stream reactor process conditions and control regulation is also feasible due to sensing routinely incorporated in the proposed power supply or added to improve overall system efficiency.

In an embodiment of the invention, the fluid containing a chemical composition that is introduced to the chemical generating device 20 comprises water and a dissolved salt and the resultants comprise at least chlorine.

In an embodiment of the invention, the chemical generating device 20 further includes a storage space 76 arranged to receive a supply of a salt composition in solid form to be dissolved by water obtained from a source of water in the appliance 22 to be used in the cleaning of the objects.

In an embodiment of the invention, the appliance 22 further includes a lockout mechanism 78 for an access door 80 used in loading objects into the wash zone 24. An activating apparatus 82 is arranged as a part of a control 84 for the lockout mechanism. The activating apparatus 82 includes a sensor 86 arranged to detect a concentration level of the chlorine, and upon detection of a level in excess of a predetermined level, the activation apparatus 82 will operate the lockout mechanism 78 via line 87 to prevent the door 80 from being opened.

The control 84 would also be used to deliver the oxidizing agent to the wash liquor to maximize performance by using sensors 87. Some types of sensors that may be preferred include pressure, pH, oxidation reduction potential, turbidity and conductivity. For example, hydrogen peroxide may be added to the wash liquor when the turbidity of the wash liquor suggests that the presence of particulate soils is low, thereby increasing the effectiveness of the oxidizing agent. Additionally, when the pH environment is optimal (greater than 9), then the oxidizing agent may be added to the system facilitating the production of hydroxyl radicals.

In an embodiment of the invention, the control 84 is arranged to monitor a voltage across the first 44 and last 46 plates via a connection 88 (FIG. 1).

In an embodiment of the invention, the control 84 is arranged to regulate an electrical current flowing through the electrodes 56, 62.

In an embodiment of the invention, the control 84 is arranged to monitor a pressure change between the inlet 28 and the outlet 34.

In an embodiment of the invention, a back-washing mechanism 90 is arranged to remove materials deposited onto the plates during the period of decomposition.

In an embodiment of the invention, the back-washing mechanism 90 is arranged to back-wash via a chemical technique.

In an embodiment of the invention, the back-washing mechanism 90 is arranged to back-wash via a thermal technique.

In an embodiment of the invention, the back-washing mechanism 90 is arranged to back-wash via a mechanical technique.

In an embodiment of the invention, the objects are cleaned in a wash liquor in the cleaning appliance 22 and the generated chemical composition has characteristics to permit an altering of a pH of the wash liquor.

As is apparent from the foregoing specification, the invention is susceptible of being embodied with various alterations and modifications which may differ particularly from those that have been described in the preceding specification and description. It should be understood that we wish to embody within the scope of the patent warranted hereon all such modifications as reasonably and properly come within the scope of our contribution to the art.

The embodiments of the invention in which an exclusive property or privilege is claimed are defined as follows:

1. An electrochemical cell device arranged in an automatic cleaning appliance used in the cleaning of objects comprising:
    a first metallic plate, a last metallic plate and a plurality of intermediate metallic plates, each of said plates having two essentially parallel sides with a large surface area in comparison with a peripheral side connecting said parallel sides,
        said plurality of plates arranged with one of said parallel sides of one plate facing one of said parallel sides of an adjacent plate, for each of said plurality of intermediate plates,
    a connection between a positive electrode of a source of direct electrical current and said first plate and a connection between a negative electrode of said source of direct electrical current and said last plate,
        said source of direct current comprises a source of rectified alternating current provided by electrical components,
    a connection to a supply of water for use in the cleaning appliance, and including a conduit leading from the supply of water used in the appliance to the electrical components providing the rectified current to cool the components with water used in the appliance, and a conduit leading from the electrical components to the cavity in the appliance to be used in the cleaning of the objects,
    an inlet to allow the introduction of a fluid containing a chemical composition to be decomposed by said cell device during a period of decomposition and an outlet to allow the dispensing of resultants of the decomposition of said chemical composition into the cavity of the appliance,
    wherein the electrochemical device generates a chemical composition and a sensing system provided within a cavity of the automatic cleaning appliance is configured to measure properties of wash liquor in the cavity of the automatic cleaning appliance and control dispensing of the chemical composition into the automatic cleaning appliance based on the measurement.

2. An electrochemical cell device according to claim 1, wherein said plurality of plates are arranged in a straight line.

3. An electrochemical cell device according to claim 1, wherein said plurality of plates are arranged in an arc.

4. An electrochemical cell device according to claim 1, wherein said automatic cleaning appliance is one of a fabric washing machine and a foodware washing machine.

5. An electrochemical cell device according to claim 1, wherein said fluid containing a chemical composition comprises water and said resultants comprise hydrogen and oxygen.

6. An electrochemical cell device according to claim 1, wherein said positive electrode connection at said first plate and said negative electrode connection at said last plate comprise the sole direct electrical connections between said source of direct electrical current and said plates.

7. An electrochemical cell device according to claim 1, wherein said fluid comprises an electrolyte and said plates are arranged in an electrical series connection with said electrolyte providing an electrical connection between adjacent plates.

8. An electrochemical cell device according to claim 1, wherein said fluid containing a chemical composition comprises water obtained from a source of water in said appliance to be used in said cleaning of objects, and including a filter upstream of said plates.

9. An electrochemical cell device according to claim 8, wherein said filter comprises a water softener mechanism.

10. An electrochemical cell device according to claim 1, including a control arranged to monitor a voltage across said first and last plates.

11. An electrochemical cell device according to claim 1, including a control arranged to regulate an electrical current flowing through said electrodes.

12. An electrochemical chemical cell device according to claim 1, including a control arranged to monitor a pressure change between said inlet and said outlet.

13. An electrochemical cell device according to claim 1, including a back-washing mechanism arranged to remove materials deposited onto said plates during said period of decomposition.

14. An electrochemical cell device according to claim 13, wherein said back-washing mechanism is arranged to back-wash via one of a chemical technique, or a thermal technique.

15. An electrochemical cell device according to claim 1, wherein said objects are cleaned in a wash liquor in said cleaning appliance and said resultants have characteristics to permit an altering of a pH of said wash liquor.

16. The electro chemical cell according to claim 1, wherein the properties of the wash liquor measured by the sensing system comprise at least one of the following: turbidity, pH, conductivity, pressure and oxidation reduction potential.

17. An electrochemical cell device arranged in an automatic cleaning appliance used in the cleaning of objects comprising:
    a first metallic plate, a last metallic plate and a plurality of intermediate metallic plates, each of said plates having two essentially parallel sides with a large surface area in comparison with a peripheral side connecting said parallel sides,
        said plurality of plates arranged with one of said parallel sides of one plate facing one of said parallel sides of an adjacent plate, for each of said plurality of intermediate plates,
    a connection between a positive electrode of a source of direct electrical current and said first plate and a connection between a negative electrode of said source of direct electrical current and said last plate,
    a conduit connecting to a source of water in said appliance to be used in said cleaning of objects, said conduit connecting to said electrochemical cell device to deliver water to said electrochemical cell device,
    an inlet to allow the introduction of a fluid containing a chemical composition to be decomposed by said cell device during a period of decomposition and an outlet to allow the dispensing of resultants of the decomposition of said chemical composition,
    a storage space provided in said electrochemical cell device downstream of said inlet and upstream of said outlet arranged to receive a supply of a salt composition in solid form to be dissolved by water obtained from the conduit, the water with dissolved salt being acted on by said plates in said electro chemical cell before the water exits the outlet,
    wherein the electrochemical device generates a chemical composition and a sensing system provided within a cavity of the automatic cleaning appliance is configured to measure properties of wash liquor in the cavity of the automatic cleaning appliance and control dispensing of the chemical composition into the automatic cleaning appliance based on the measurement, and further including a user openable door for said cavity and a lockout mechanism operatively associated with the door to prevent opening of said door under certain conditions, and an activating apparatus for said lockout mechanism, said activating apparatus including a sensor arranged to detect a concentration level of chlorine in said cavity.

18. An electrochemical cell device arranged in an automatic cleaning appliance used in the cleaning of objects comprising:
a first metallic plate, a last metallic plate and a plurality of intermediate metallic plates, each of said plates having two essentially parallel sides with a large surface area in comparison with a peripheral side connecting said parallel sides,
said plurality of plates arranged with one of said parallel sides of one plate facing one of said parallel sides of an adjacent plate, for each of said plurality of intermediate plates,
a connection between a positive electrode of a source of direct electrical current and said first plate and a connection between a negative electrode of said source of direct electrical current and said last plate,
an inlet to allow the introduction of a fluid containing a chemical composition to be decomposed by said cell device during a period of decomposition and an outlet to allow the dispensing of resultants of the decomposition of said chemical composition,
said fluid containing a chemical composition comprising water and a dissolved salt and said resultants comprising at least chlorine,
wherein the electrochemical device generates a chemical composition and a sensing system provided within a cavity of the automatic cleaning appliance is configured to measure properties of wash liquor in the cavity of the automatic cleaning appliance and control dispensing of the chemical composition into the automatic cleaning appliance based on the measurement, and
a user openable door for said cavity and a lockout mechanism operatively associated with the door to prevent opening of said door under certain conditions, and an activating apparatus for said lockout mechanism, said activating apparatus including a sensor arranged to detect a concentration level of chlorine in said cavity.

19. An electrochemical cell device according to claim 18, wherein said source of direct electrical current comprises a power source of one of a rectified alternating current or an inverted alternating current.

20. An electrochemical cell device according to claim 18, wherein said automatic cleaning appliance is one of a fabric washing machine or a foodware washing machine.

21. An electrochemical cell device according to claim 18, wherein said positive electrode connection at said first plate and said negative electrode connection at said last plate comprise the sole direct electrical connections between said source of direct electrical current and said plates.

22. An electrochemical cell device according to claim 18, wherein said fluid containing a chemical composition comprises water obtained from a source of water in said appliance to be used in said cleaning of objects, and including a filter upstream of said plates.

23. An electrochemical cell device according to claim 22, wherein said filter comprises a water softener mechanism.

24. An electrochemical cell device according to claim 18, including a control arranged to monitor a voltage across said first and last plates.

25. An electrochemical cell device according to claim 18, including a control arranged to regulate an electrical current flowing through said electrodes.

26. An electrochemical cell device according to claim 18, including a back-washing mechanism arranged to remove materials deposited onto said plates during said period of decomposition.

27. An electrochemical cell device according to claim 26, wherein said back-washing mechanism is arranged to back-wash via one of a chemical technique, or a thermal technique.

28. An electrochemical cell device according to claim 18, wherein said objects are cleaned in a wash liquor in said automatic cleaning appliance and said resultants have characteristics to permit an altering of a pH of said wash liquor.

29. The electrochemical cell according to claim 18, wherein the properties of the wash liquor measured by the sensing system comprises at least one of the following: turbidity, pH, conductivity, pressure and oxidation reduction potential.

30. An electrochemical cell device according to claim 18, wherein said plurality of plates are arranged in a straight line.

31. An electrochemical cell device according to claim 18, wherein said plurality of plates are arranged in an arc.

32. An electrochemical cell device according to claim 18, wherein said fluid comprises an electrolyte and said plates are arranged in an electrical series connection with said electrolyte providing an electrical connection between adjacent plates.

* * * * *

UNITED STATES PATENT AND TRADEMARK OFFICE
CERTIFICATE OF CORRECTION

PATENT NO. : 7,625,470 B2  Page 1 of 1
APPLICATION NO. : 10/823283
DATED : December 1, 2009
INVENTOR(S) : Wright et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 822 days.

Signed and Sealed this

Second Day of November, 2010

David J. Kappos
*Director of the United States Patent and Trademark Office*